Feb. 2, 1960    E. JEDRZYKOWSKI    2,923,171
CREEPER SPEED DRIVE MECHANISM FOR A VEHICLE
Filed April 29, 1957    2 Sheets-Sheet 2
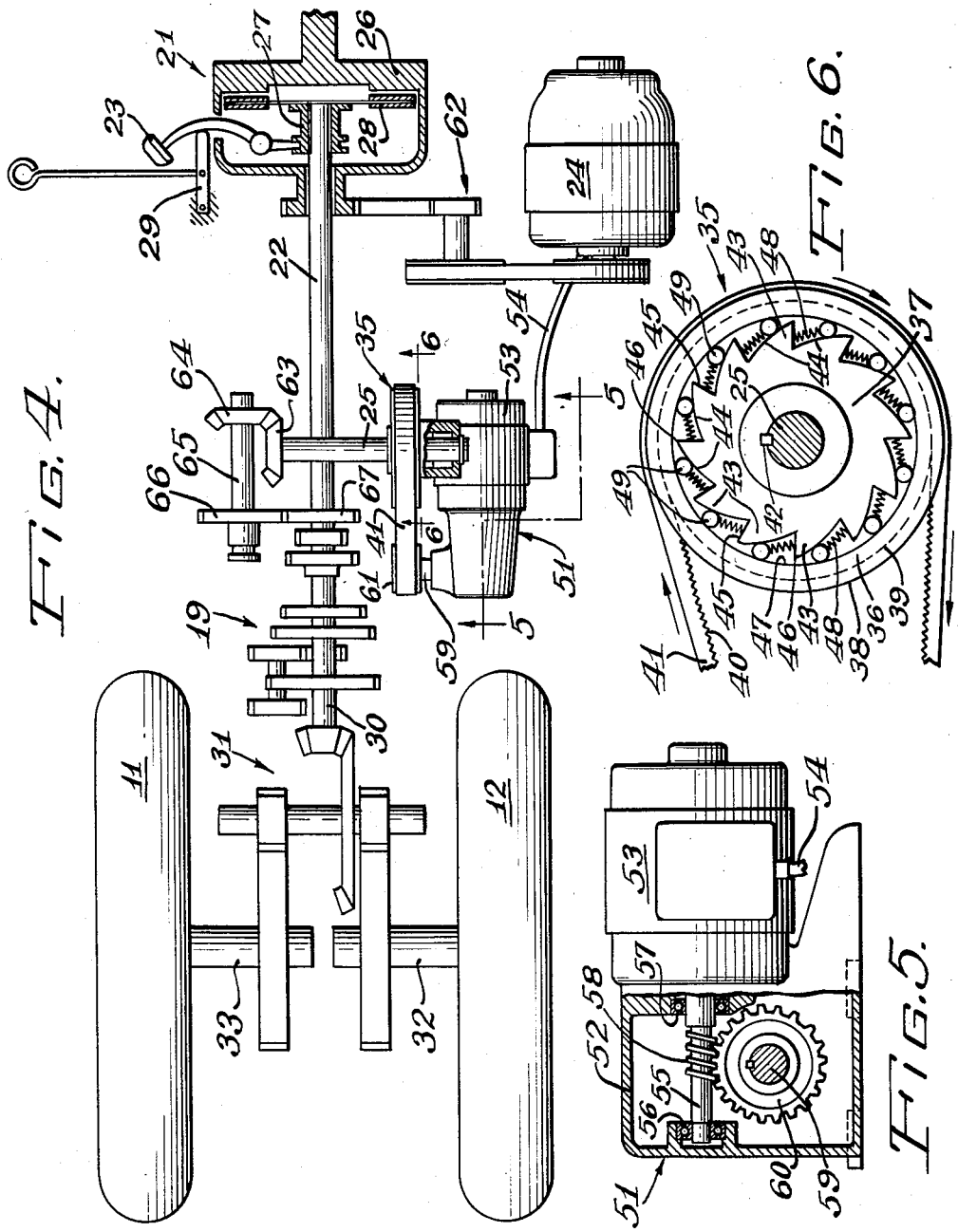
Inventor:
Edmund Jedrzykowski United States Patent Office 2,923,171
Patented Feb. 2, 1960

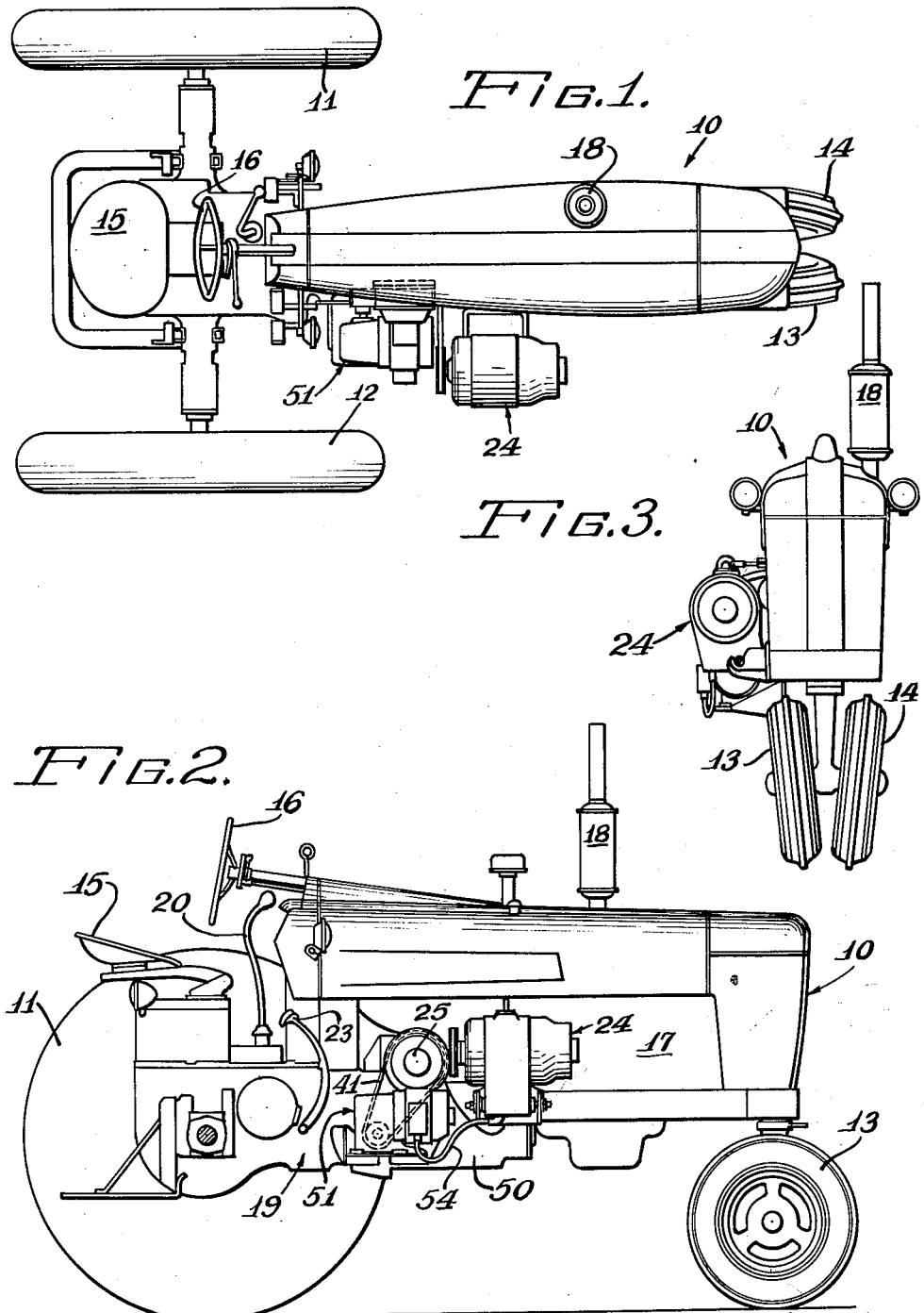

2,923,171

CREEPER SPEED DRIVE MECHANISM FOR A VEHICLE

Edmund Jedrzykowski, Chicago, Ill., assignor to International Harvester Company, Chicago, Ill., a corporation of New Jersey Application April 29, 1957, Serial No. 655,902

5 Claims. (Cl. 74—664)

This invention relates to a mechanism for driving a vehicle, such as a tractor, at extremely low speeds. More in particular this invention relates to an electrically driven apparatus for propelling a tractor at extremely low speeds which is operatively independent of conventional direct drive connection between the tractor's power plant and its ground engaging elements.

"Creeper speeds" may be defined as those speeds of a vehicle below that obtained by a conventional transmission normally provided on the vehicle particularly under loaded conditions where the engine speed is necessarily relatively high in order to deliver the required power.

Tractors are customarily provided with conventional selective change-speed transmissions whereby the rate of travel may be varied from moderately slow-speed to a relatively high speed assuming a constant engine speed is maintained. However when speeds of travel over the ground up to about one or even two miles per hour are required under loaded conditions the low speed gear combination provided in the conventional tractor change-speed transmission is usually unsatisfactory because the tractor engine would necessarily be required to operate at speeds too low for the engine to deliver the required horsepower. For example when a cotton picking unit is mounted on a tractor the engine speed required for delivery of sufficient power to operate the picking unit as well as propel the vehicle along the ground is high so that even if the conventional change-speed transmission is engaged in the lowest speed gear ratio the rate of speed of the tractor along the ground is much too fast. Often a conventional tractor is converted to a special use tractor by substituting the conventional change-speed transmission with one having the required lower speed gear train ratios. This form of conversion is not only expensive but inhibits the usefulness of the converted tractor for other purposes.

An important object of this invention is to provide electrical auxiliary means for driving a tractor at creeper speeds particularly under loaded conditions.

Another object of this invention is to provide a removably mounted auxiliary electric drive mechanism on a conventional tractor drivingly connected to the change-speed transmission through the tractor's power take-off shaft or otherwise for propelling the tractor at creeper speeds.

A further object of this invention is to provide an electric creeper speed drive mechanism, according to the preceding objects, which is operatively independent of any direct drive connection between the tractor's engine and its conventional change-speed transmission.

A still further object of this invention is to provide an electric creeper speed drive mechanism mounted removably on a conventional tractor whereby either creeper speeds or conventional speeds may be selectively employed without stopping the tractor.

A yet further object of the invention is to provide an electric creeper speed mechanism according to the preceding objects which is of inexpensive construction and easily installed.

These and other desirable and important objects inherent in and encompassed by the invention will be more readily understood from the ensuing description, the appended claims and the annexed drawings wherein:

Figure 1 is a plan view of a conventional tractor having a general purpose electric dynamo and provided with an electric creeper speed drive mechanism of this invention mounted thereon.

Figure 2 is a side elevation corresponding to Figure 1 except that one ground engaging wheel is removed illustrating the mounted position of the electric creeper speed drive mechanisms of this invention.

Figure 3 is a front elevation corresponding to Figure 1 showing the mounted electric dynamo on the tractor.

Figure 4 is in part a schematic drawing and part plan elevation of the tractor in Figure 1 illustrating the conventional drive mechanism between the tractor's engine and ground engaging wheels and also illustrating the electrical creeper speed drive mechanism of this invention in relation to the tractor.

Figure 5 is a side elevation taken along the line 5—5 of Figure 4, partly in broken section illustrating the construction of the gear reducing component of this invention.

Figure 6 is a side elevation partly broken away illustrating the construction of the over-running clutch component of this invention.

Referring to the drawings the numeral 10 indicates generally a tractor having ground engaging elements or wheels of the traction type 11 and 12 and dirigible type supporting wheels 13 and 14 adapted for steering. The tractor 10 also includes the conventional operator's seat 15, steering control wheel 16, engine or power plant 17, exhaust muffler 18, and change-speed transmission, generally indicated at 19 having a plurality of engageable gear trains of different speed ratios selectively operable through shifting of the lever 20. The tractor 10 is also provided with the usual main clutch 21 for releasably engaging the engine 17 with the transmission 19 through a drive shaft 22 by operation of the pedal 23. In addition the tractor 10 is provided with a source of electric energy in the form of a dynamo or generator 24 which is driven independently by the engine 17, and, a power take-off shaft 25 in driven relation with the drive shaft 22. The generator 24 may conveniently be of a multi-use utility type. For example a three phase 220 volt 60 cycle alternating current generator has been found to be convenient for use in connection with this invention. The driving means from the engine 18 to the generator 24 may be of any conventional type such as that indicated generally at 62 in Figure 4.

Referring now to the schematic drawing (Figure 4) the crankshaft (not shown) of the engine 17 is connected directly to the drive component 26 of the main clutch 21 while the driven component 27 is connected to the drive shaft 22 in a conventional main clutch arrangement. The driven component 27 is provided with the usual friction engaging annular disc 28 adapted for releasable engagement with the drive component 26 by selective operation of the clutch pedal 23 in a conventional manner. In order to maintain the main clutch 21 in disengaged position for long periods of time a stop 29 is provided which stop when in use as shown in Figure 4 abuts the pedal 23 so that the pedal cannot move into a clutch engaging position.

The drive shaft 22 is in driving relation with the conventional change-speed transmission 19 whose driven shaft 30 is connected in drive relation with the wheels 11 and 12 through a conventional gearing differential mechanism generally indicated at 31 and rear axles 32 and 33. Thus a conventional tractor has been described wherein the engine 17 may be engaged in drive relation through the main clutch 21 and any one of a plurality of gear trains of different speed ratios in the change-speed transmission 19, to the differential mechanism 31 and axles 32 and 33 for driving the wheels 11 and 12. On the other hand the drive connection from the engine 17 to the wheels 11 and 12 may be disconnected by shifting the transmission 19 into neutral position or disengaging the main clutch 21, or both.

In the embodiment shown the power take-off shaft 25 extends outwardly or externally of the tractor on one side for belt driving machinery such as a threshing machine using a suitable pulley (not shown) on the shaft 25. The creeper speed drive mechanism of this invention may conveniently be removably mounted adjacent the power take-off shaft 25 as an auxiliary drive means. A practical embodiment of the creeper speed drive mechanism of this invention will now be described.

Referring now to Figures 4 and 6 in particular it will be seen that on the external portion of the power take-off shaft 25 there is provided an over-running clutch generally indicate at 35 which may be of conventional construction. The clutch 35 may be comprised of a drive or driving member 36 and a driven member 37 disposed concentrically within the driving member 36. The outer peripheral surface of the driving member 36 is provided with a pair of axially spaced flanges, one of which is shown at 38, and the cylindrical portion 39 between the flanges may be serrated or toothed for positive drive cooperation with the corresponding serrations or teeth 40 of the belt 41. The driven member 37 is constrained for rotation with the power take-off shaft 25 in any conventional manner such as by key 42. The outer peripheral portion of the driven member 37 is provided with a series of tooth-shaped protuberances 43 each having a curved surface 44 and a drop surface 45 forming radially disposed points 46. The driving member 36 is provided with an inner annular surface 47 which is concentric with the driven member 37 and its associated teeth or protuberances 43. To each of the drop surfaces 45 of the driven member 37 is anchored one of a series of helical springs 48. The other end of each of the springs 48 abuts one of a series of steel balls 49 whereby each of the springs 48 is in a compressed relation urging the balls 49 into contact with the inner annular surface 47 of the driving member 36 and the curved surface 44 of the driven member 37. Thus it can be seen that if the driving member 36 is rotated counterclockwise with respect to the driven member 37 the balls 49 will tend to move in a direction to further compress the springs 48 whereby no rotative movement will be imparted to the driven member 37. On the other hand if the driving member 36 is rotated in a clockwise direction, the action of the surface 47 and the springs 48 tend to cause the balls 49 into a wedging or frictional engagement with both the surface 47 and the surfaces 44 so that the driven member 37 becomes constrained for rotation with the driving member 36. Thus the member 36 may rotate freely in one direction with respect to the member 37 but locks both members in the opposite direction of rotation.

Mounted on the tractor housing 50 by suitable bolts (not shown) is a speed reducing device generally indicated at 51. Referring to Figure 5 the device 51 may conveniently be comprised of a casing 52 having an electric motor 53 with electric power lead-in wires 54 included therewith. The electrical characteristics of the motor 53 should be compatibly constructed for energizing from the generator 24. In this case the motor 53 may be either a constant speed or variable speed three phase, 220 volt, 60 cycle alternating current induction type unit having the power lead-in wires or cable 54 connected with suitable control switches (not shown) on the generator 24. Thus the motor 24 is controllably energized from the generator 24.

The speed reduction device 51 is provided with a power input shaft 55 (Figure 5) which for convenience may be an extension of the rotor shaft of the motor 53. The input shaft 55 is rotatably supported by the bearing assemblies 56 and 57 and is provided with a worm gear 58. Transversely of the shaft 55 and in spaced relation is a power output shaft 59 supported rotatably by a pair of bearings (not shown) similar in character to the bearings 56 and 57 suitably disposed in the casing 52. Constrained for rotation with the output shaft 59 within the casing 52 is disposed a pinion gear 60 positioned in cooperative relation with the worm gear 58. As may be seen from Figure 4 the output shaft 59 extends externally of the casing 52 and is constrained for rotation with a pulley 61 mounted thereon. The pulley 61 is positioned in alignment with the over-running clutch 35 and is adapted to cooperate with the belt 41 in positive drive relation such as by providing serrations or teeth (not shown) on the outer peripheral surface thereof to correspond with the teeth 40 of the belt 41 in engaging relation.

From the above it can be readily seen that when the main clutch 21 is disengaged and the engine 17 is in driving relation with the generator 24 through the drive component 26 of the main clutch 21 and conventional belt and pulley drive arrangement generally indicated at 62 (Figure 4) the generator 24 in turn energizes the motor 53 which then drives the drive shaft 22 through the speed reducing device 51, belt 41 and power take-off shaft 25. The connection between the shaft 25 and shaft 22 can be of any convenient form such as by bevel gear 63 constrained for rotation with shaft 25 which gear is in meshed relation with a second bevel gear 64, the gear 64 being constrained for rotation with countershaft 65, and the countershaft 65 being constrained for rotation with gear 66 meshed with gear 67, the gear 67 being constrained for rotation with the shaft 22 as best illustrated schematically in Figure 4.

Having now described the construction details of one embodiment of the invention the operation thereof will now be described.

*Operation*

With the main clutch 21 disengaged and the motor 53 de-energized the operator shifts the change-speed transmission 19 from the neutral position into a selected gear train ratio usually the lowest speed ratio between the drive shaft 22 and the ground engaging elements 11 and 12. The operator then engages the main clutch 21 thus causing the engine 17 to drive the tractor 10 along the ground. The operator then energizes the motor 53 by closing a suitable electric switch (not shown) which electrically connects the motor 53 with the generator 24. Owing to the speed of the engine 17 the shaft 25 will rotate the member 37 of the over-running clutch 35 at a clockwise speed greater than that of the member 36 thereof. Thus under such condition the motor 53 will not be in driving relation with the shaft 25 but on the other hand will operate under a no-load condition. Now if the operator depresses the pedal 23 thereby disengaging the main clutch 21, the drive shaft 22 and power take-off shaft 25 would tend to stop. However, when the power take-off shaft 25 and its associated driven member 37 of the over-running clutch 35 slows down so that the rotational speed of the member 37 is substantially equal to that of the drive member 36, the springs 48 and associated balls 49 will engage the member 36 with the member 37. Thus the motor 53 will then be connected in driving relation with the power take-off shaft 25 which shaft is in turn connected in driving relation with the drive shaft 22. Thus the motor 53 is in driving relation with the ground engaging elements or wheels 11 and 12 but owing to the speed reducing device 51 the drive shaft 22 is driven by the motor 53 at an appreciably lower speed than the speed of the drive component 26 of the disengaged main clutch 21. From this it can be seen that the tractor 10 will progress along the ground at a creeper speed while at the same time the engine 17 will rotate at a relatively high speed so that the required power may be delivered for other purpose such as a cotton picking mechanism. Subsequently should the operator decide to propel the tractor by conventional drive he merely reengages the main clutch 21.

To remove the creeper speed mechanism all that is necessary is to disconnect the cable 54, remove the speed reducing device 51 and over-running clutch 35 all of which may be accomplished in but a few minutes' time.

Having thus described my embodiment of the invention, it can now be seen that the objects of the invention have been fully achieved and it must be understood that changes and modifications may be made which do not depart from the spirit of the invention nor from the scope thereof as defined in the appended claims.

What is claimed is:

1. For a vehicle having a power plant, a change-speed transmission including a drive shaft connectable to a driven shaft by selective engagement of one of a plurality of gear trains of different speed ratios, a main clutch means adapted to connect releasably said power plant with said drive shaft in driving relation, ground-engaging elements connected to said driven shaft in driven relation, a power take-off shaft connected to said drive shaft in driven relation, and a source of electric energy associated with said power plant; a creeper speed drive mechanism comprising in combination a speed reduction device mounted on said vehicle having an input shaft and an output shaft, an electric motor drivingly connected to said input shaft, means mounted on said vehicle for energizing said electric motor from said source of electric energy, and an overrunning clutch having a driving member and a driven member mounted on said vehicle, said driven member of said over-running clutch being connected to said power take-off shaft in drive relation and said driving member being connected in driven relation to said output shaft whereby said electric motor engages in driving relation with said drive shaft for rotation thereof at low speed when said main clutch is disengaged.

2. For a tractor having ground-engaging elements operatively propelled by an engine through a disengageable main clutch and a change-speed transmission associated therewith, said transmission having a drive shaft selectively connectable to a driven shaft through gear trains of different speed ratios, a power take-off shaft drivenly connected to said drive shaft, and a source of electric energy mounted on said tractor; an electric creeper speed drive mechanism comprising in combination a speed reduction device mounted on said tractor, said device having an input shaft and an output shaft, an over-running clutch mounted adjacent said device, said over-running clutch having a driving member and a driven member, said driving member being connected to said output shaft in driven relation, said driven member being connected to said power take-off shaft in driving relation, and an electric motor mounted on said vehicle and energized by said source of electric energy, said electric motor being drivingly connected to said input shaft whereby said motor engages in driving relation with said drive shaft for rotation thereof at low speed when said main clutch is disengaged.

3. For a vehicle having ground-engaging elements operatively propelled by an engine through a disengageable main clutch and a change-speed transmission associated therewith, said transmission having a drive shaft selectively connectable to a driven shaft through gear trains of different speed ratios, and a source of electric energy; an electric creeper speed drive mechanism comprising in combination an over-running clutch, said over-running clutch having a driving member and a driven member, said driven member being connected to said drive shaft in driving relation, an electric motor mounted on said vehicle energizable by said source of electric energy, speed reduction means connected in drive relation to said motor and said driving member whereby said motor engages in driving relation with said drive shaft for rotation thereof at low speed when said main clutch is disengaged.

4. For a vehicle having ground-engaging elements operatively propelled by an engine through a disengageable main clutch and a change-speed transmission associated therewith, said transmission having a drive shaft selectively connectable to a driven shaft through gear trains of different speed ratios, a power take-off shaft connectable to said transmission in drive relation, and a source of electric energy; a detachably mounted auxiliary creeper speed drive mechanism comprising in combination a speed reduction device detachably mounted on said vehicle, said device having an input shaft and an output shaft, an electric motor drivingly connected to said input shaft, means mounted on said vehicle for energizing said motor from said source of electric energy, an over-running clutch having a driving member and a driven member, said driven member being supported by and connected to said power take-off shaft in drive relation, said drive member of said over-running clutch being connected to said output shaft of said speed reduction device in driven relation whereby said electric motor engages in driving relation with said drive shaft for rotation thereof at low speed when said enginge is disconnected from said drive shaft by disengagement of said main clutch.

5. For a tractor having ground-engaging elements operatively propelled by an engine including releasable means for connecting said engine with said elements, and a source of electric energy mounted on said tractor; a creeper speed drive mechanism comprising in combination an over-running clutch having a driving member and a driven member, said driven member being connectable to said ground-engaging elements in drive relation, a speed reduction device having a driving element and a driven element, said driven element of said device being connected to said driving member of said clutch in drive relation, an electric motor drivingly connected to said driving element of said device, means mounted on said vehicle for energizing said electric motor from said source of electric energy whereby said electric motor is drivably connectable to said ground-engaging elements for movement thereof at low speed when said releasable means is disconnected.

References Cited in the file of this patent

UNITED STATES PATENTS

| 1,233,877 | Henderson | July 17, 1917 |
| 1,984,831 | Higley | Dec. 18, 1934 |
| 1,992,210 | Higley | Feb. 26, 1935 |
| 2,112,430 | Tholl | Mar. 29, 1938 |
| 2,829,724 | Burns et al. | Apr. 8, 1958 |

FOREIGN PATENTS

| 905,930 | Germany | Mar. 8, 1954 |
| 764,798 | Great Britain | Jan. 2, 1957 |